(12) United States Patent
Keller et al.

(10) Patent No.: US 7,073,642 B2
(45) Date of Patent: Jul. 11, 2006

(54) GAS SPRING

(75) Inventors: Arno Keller, München (DE); Bertram Heydenreich, Neubiberg (DE); Andreas Krog, Winkelhaid (DE)

(73) Assignee: Suspa Holding GmbH, Altdorf (DE)

( * ) Notice: Subject to any disclaimer, the term of this patent is extended or adjusted under 35 U.S.C. 154(b) by 0 days.

(21) Appl. No.: 10/922,105

(22) Filed: Aug. 20, 2004

(65) Prior Publication Data

US 2005/0045438 A1    Mar. 3, 2005

(30) Foreign Application Priority Data

Aug. 22, 2003  (DE)  ................. 103 39 188

(51) Int. Cl.
*F16F 9/50*  (2006.01)

(52) U.S. Cl. ................. 188/282.5; 267/64.12

(58) Field of Classification Search ........... 188/322.19, 188/322.5, 282.5, 280, 282.1, 282.6, 314, 188/284; 267/64.12, 64.11, 64.13, 64.14
See application file for complete search history.

(56) References Cited

U.S. PATENT DOCUMENTS

| | | | |
|---|---|---|---|
| 4,166,522 A | 9/1979 | Bourcier de Carbon | |
| 4,433,759 A | 2/1984 | Ichinose | |
| 4,595,182 A | 6/1986 | Freitag et al. | |
| 5,797,593 A | 8/1998 | Oyaizu | |
| 5,823,512 A * | 10/1998 | Oyaizu | 267/64.12 |
| 5,887,857 A * | 3/1999 | Perrin | 267/64.12 |
| 5,971,117 A | 10/1999 | Grundei et al. | |
| 6,007,057 A | 12/1999 | Fuhrmann et al. | |
| 6,202,979 B1 | 3/2001 | Wolfgang et al. | |
| 6,213,261 B1 * | 4/2001 | Kunkel | 188/314 |
| 6,776,269 B1 * | 8/2004 | Schel | 188/284 |

FOREIGN PATENT DOCUMENTS

| | | |
|---|---|---|
| DE | 27 18 800 A | 11/1977 |
| DE | 31 34 536 A | 4/1982 |
| DE | 33 01 544 A | 7/1984 |
| DE | 197 02 628 A | 4/1998 |
| DE | 196 49 836 A | 6/1998 |
| DE | 198 46 373 A | 4/2000 |
| DE | 198 42 155 A | 5/2000 |
| DE | 102 00 073 C | 6/2003 |
| EP | 0 781 938 A | 7/1997 |
| EP | 0 806 587 A | 11/1997 |
| EP | 992705 A2 * | 4/2000 |

* cited by examiner

*Primary Examiner*—Melanie Torres
(74) *Attorney, Agent, or Firm*—Browdy and Neimark, PLLC

(57) ABSTRACT

A gas spring comprises a cylindrical casing, in which a piston rod is guided for displacement concentric of a central longitudinal axis. A damping piston is mounted on the piston rod, dividing the interior of the casing into two sectional casing chambers. A filling of compressed gas is provided inside the casing. A damping device is provided for velocity-dependent damping of a motion of stroke of the damping piston and another damping device is provided for path-dependent damping of a motion of stroke of the damping piston. The result is a gas spring of excellently controllable stroke behaviour.

12 Claims, 8 Drawing Sheets

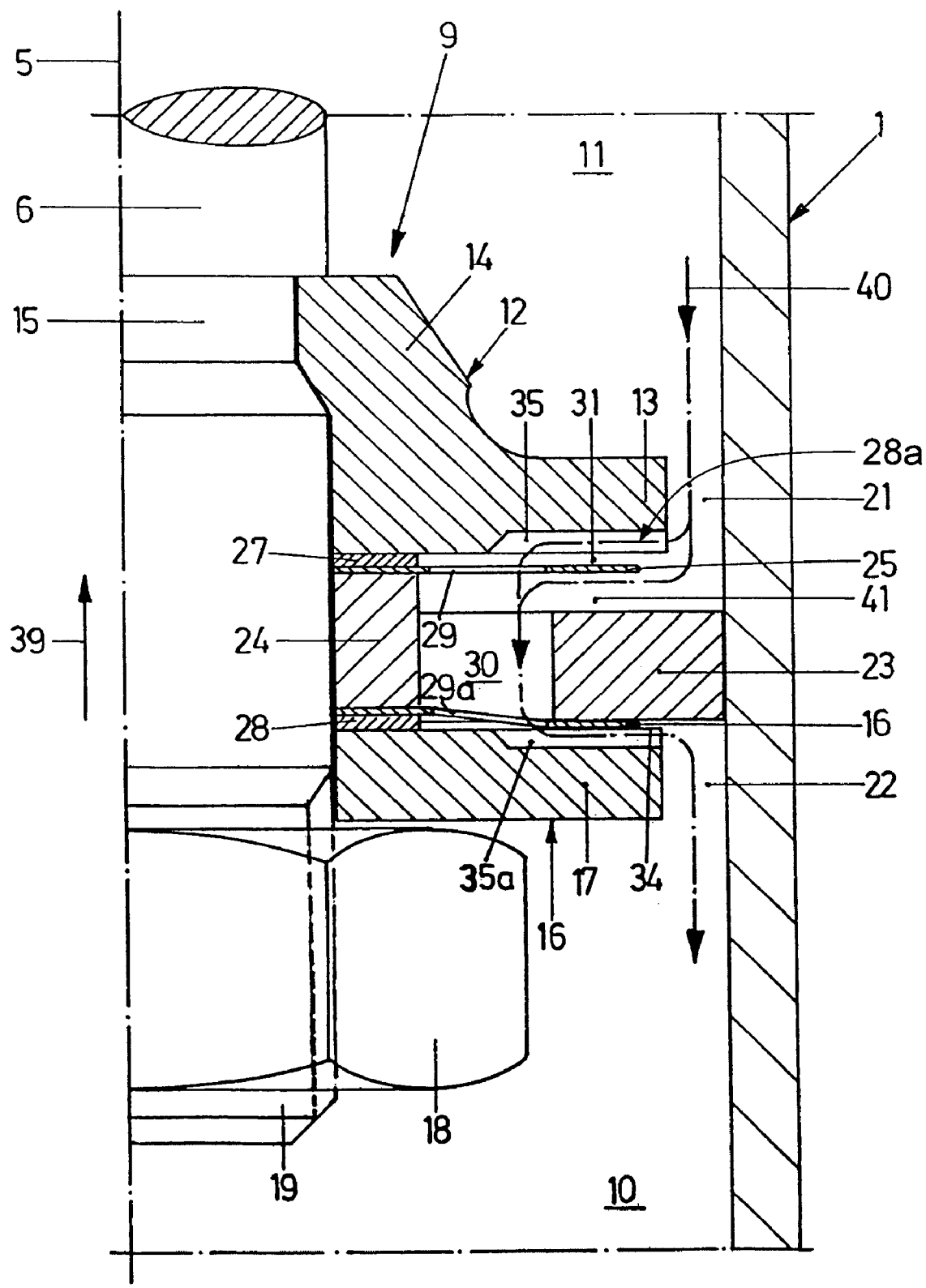

GAS SPRING

BACKGROUND OF THE INVENTION

1. Field of the Invention

The invention relates to a gas spring.

2. Background Art

Gas springs featuring a damped motion of stroke of an internal damping piston have been known from prior public use, in particular for damping the closing motion of a motor-vehicle engine hood or tail gate. Breakdown of the closing element, the closing motion of which the damper is intended to absorb, cannot be reliably precluded in familiar gas springs. For damages resulting from such a breakdown to be avoided, complicated supplementary steps have to be taken, among which to name for example flexible stops or sufficient play provided between adjoining components. Aspects of cost and design make these measures undesirable.

SUMMARY OF THE INVENTION

It is an object of the present invention to develop a gas spring in such a way that excellently controllable stroke behaviour is obtained.

According to the invention, this object is attained in a gas spring comprising a cylindrical casing which has an inside wall, a central longitudinal axis, a bottom and an end opposite the bottom; a piston rod which is concentric of the central longitudinal axis and which is extended from the end through a guide and seal unit and out of the casing; a damping piston which is disposed on an end, inside the casing, of the piston rod, inside dividing the casing into two sectional casing chambers; a filling of compressed gas inside the casing; a damping device for velocity-dependent damping of a motion of stroke of the damping piston; and another damping device for path-dependent damping of a motion of stroke of the damping piston.

The gist of the invention firstly resides in integrating a velocity-dependent damping device in the gas spring. U.S. Ser. No. 09/412,356 teaches a damper characterized by velocity-dependent damping. In this damper, high closing velocities will have a strongly increased damping effect, possibly leading to complete blockage. A damper of this type, when used in a closing device, may negatively affect the closing behaviour. For this to be avoided, velocity-dependent dampers are as a rule designed for action only from a comparatively high velocity of stroke onwards. This will not always reliably preclude any breakdown of the closing element the closing motion of which the damper is intended to attenuate. The damper of U.S. Ser. No. 09/412,356 has therefore been improved according to the invention by integration of a path-dependent damping device. The invention proceeds from the experience that a gas spring that provides for a path-dependent damping effect in addition to velocity-dependent damping will adapt optimally to the respective requirements of incorporation as far as controllability of the motion of stroke of its damping piston is involved. When used in an engine hood or tailgate, the gas spring according to the invention will accomplish a stopping effect, the damping characteristic of which simultaneously depending on the velocity and path of closing. Prior to the hood or gate slamming shut, an increased damping effect may be obtained reliably by the additional path-dependent damping, reducing the closing velocity to a range far below the threshold that would spark velocity-dependent damping. The result is a gas spring of excellently controllable and reliable operating behaviour. When used in an engine hood or tailgate, it will in particular prevent any breakdown. Components such as stops for breakdown protection can be dropped. There is no longer any need for joint enlargement between adjacent components. It is possible, by the aid of the velocity-dependent damping device on the one hand and the path-dependent damping device on the other, to set the damping characteristic for conveniently increased acoustic ambience accompanying any motion of stroke of the gas spring. Additional measures for the reduction of manufacturing tolerances can be dropped.

A gas spring, in which the path-dependent damping device is embodied for stronger damping of the motion of stroke in an area of two end positions thereof than in an area of the remaining stroke, offers some increase in damping especially in the final range of push-in motion so that any damages by component parts colliding in the end position can be precluded.

Multi-stage damping will variably adapt to the respective field of application of the gas spring.

A path-dependent damping device can easily be put into practice from a manufacturing point of view when being embodied as a damping-fluid passage of path-dependently varying cross section between the two sectional casing chambers, with the cross section of the damping-fluid passage in the area of one of the two end positions of the stroke being smaller than it is in the area of the remaining stroke.

In this case, a multistage damping effect can easily be obtained by the variation of the cross section of the damping device taking place in several steps.

A longitudinal groove on an inside wall of the casing, the width of which varying for cross-sectional variation, is an especially simple way of embodying a path-dependent damping device in the form of a damping passage.

Embodiments of the gas spring that include a damping fluid in the form of temperature-resistant oil, a synthetic-based damping fluid or a silicone-based damping fluid ensure ever reproducible gas spring behaviour even at strongly fluctuating temperatures, for example upon application in a motor vehicle.

Further features, advantages and details of the invention will become apparent from the ensuing description of an exemplary embodiment, taken in conjunction with the drawing.

BRIEF DESCRIPTION OF THE DRAWING

FIG. 3 is a plan view of a valve disk;

FIG. 7 is an illustration of the damping piston at a high push-out velocity;

DESCRIPTION OF A PREFERRED EMBODIMENT

Figure 1:
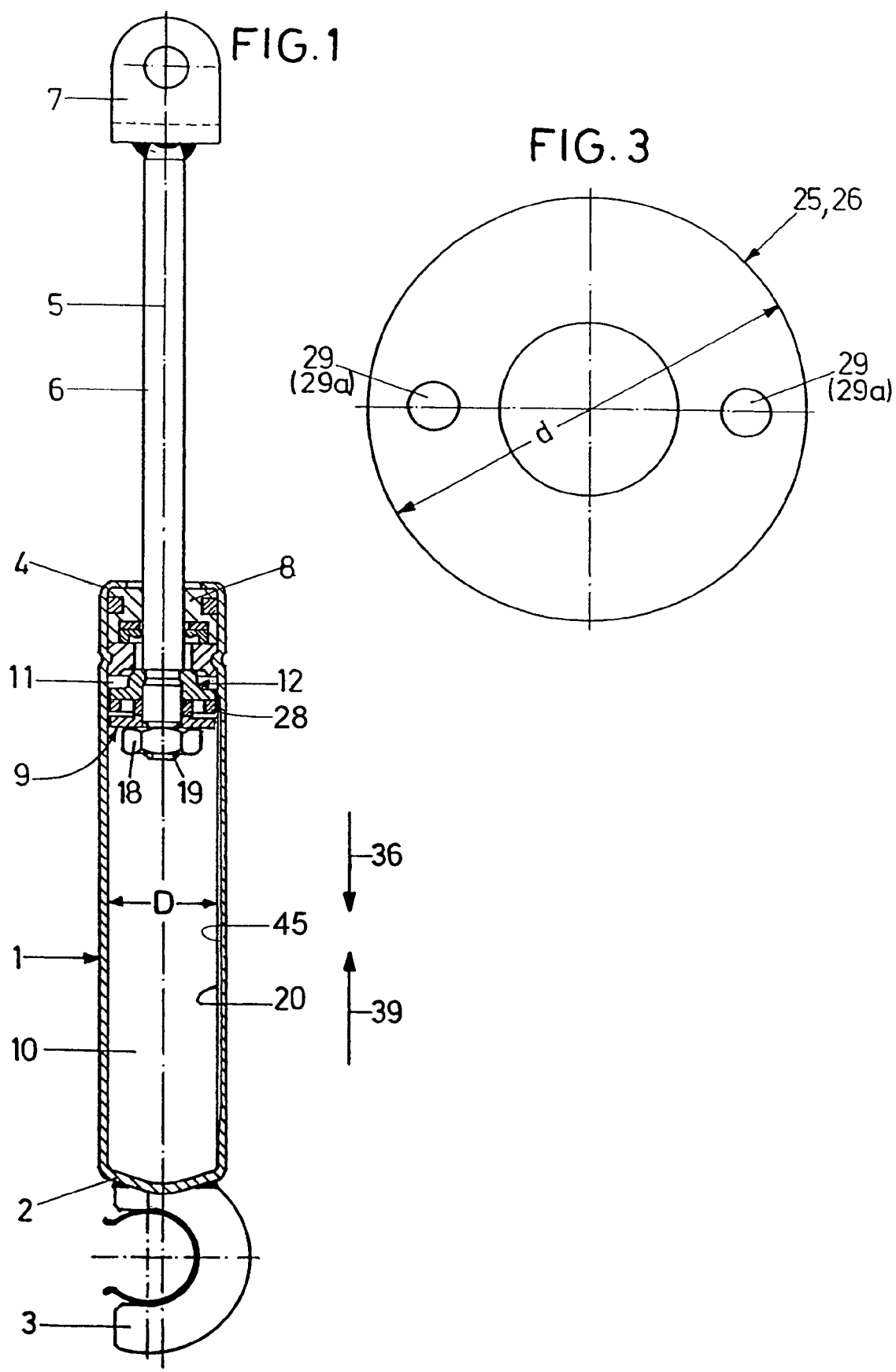
FIG. 1 is a longitudinal sectional view of a gas spring.

The gas spring seen in FIG. 1, which is for example a tailgate gas spring, comprises a substantially cylindrical casing 1 in the form of a tube, one end of which is closed by a bottom 2. The casing 1 is filled with compressed gas as a gas-spring energy storing device. A claw-type fastening element 3 is mounted on the bottom 2. At the end 4 opposite the bottom 2, a piston rod 6 is extended out of the casing 1; it is coaxial with the central longitudinal axis 5 of the casing 1. The outer free end of the piston rod 6 comprises another fastening element 7. At the end 4, the piston rod 6 is guided by a guide and seal unit 8 in a liquid- and gasproof manner for displacement in the direction of the axis 5.

The end, inside the casing 1, of the piston rod 6 is provided with a damping piston 9 which is going to be described in detail below. This damping piston 9 divides the interior of the casing 1 into two sectional casing chambers 10, 11, the sectional chamber 10 of which being formed between the damping piston 9 and the bottom 2 and the sectional chamber 11 between the damping piston 9 and the guide and seal unit 8. With the exception of damping devices that are still going to be described, gas springs of this type are familiar and commercial.

Figure 2:
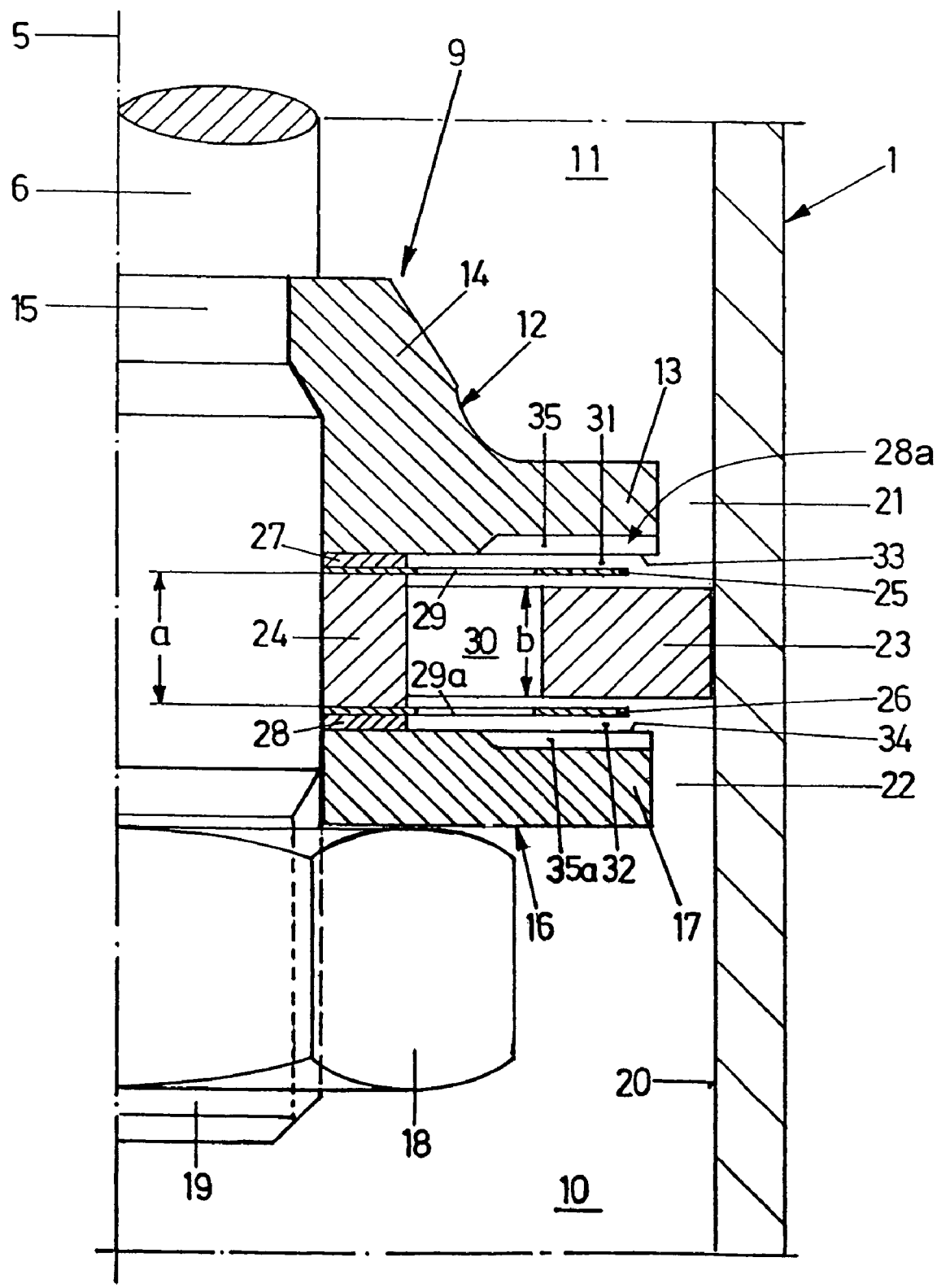
FIG. 2 is an illustration, on a strongly enlarged scale, of the damping piston of the gas spring in a position of rest.

As seen in FIG. 2, the damping piston is of multi-piece design. It comprises a pressure-piston member 12, the functionally essential part of which is an annular disk 13 on which a fastening bush 14 is formed, crimping into an annular groove 15 of the piston rod 6 so that the piston member 12 is tightly mounted on the piston rod 6 in the direction of the axis 5. This piston member 12 defines the damping piston 9 towards the sectional chamber 11.

In a direction towards the sectional chamber 10, the damping piston 9 is defined by a traction-piston member 16 of a structure in the way of a cylindrical annular disk 17 which, just as the annular disk 13, is mounted without play on the piston rod 6 radially of the axis 5. In the direction of the axis 5 towards the sectional chamber 10, the traction-piston member 16 is retained by a nut 18 which is screwed on a corresponding thread 19 attached to the piston rod 6. Annular gaps 21 and 22 are respectively formed between the pressure-piston member 12 and the traction-piston member 16 and an inside wall 20 of the casing 1. Disposed between the piston member 12 and the piston member 16 is an annular piston 23, which is substantially without play but easily displaceable in the direction of the axis 5, overlapping the annular gaps 21, 22. A spacer sleeve 24 is disposed on the piston rod 6 centrally between the piston members 12 and 16 and on a level with the annular piston 23. A pressure-valve disk 25, turned towards the pressure-piston member 12, and a traction-valve disk 26, turned towards the traction piston 16, rest on either side of the spacer sleeve 24, with annular distance plates 27 and 28 being provided between them and the respectively neighboring piston members 12 and 16. These distance plates 27, 28 have a minor thickness of for instance 0.25 mm in the direction of the axis 5. By means of the nut 18, the package comprising the traction-piston member 16, distance plate 28, traction-valve disk 26, spacer sleeve 24, pressure-valve disk 25, distance plate 27 and the pressure-piston member 12 is clamped in the direction f the axis 5. Together with the annular piston 23, this package constitutes a damping device 28a for damping a motion of stroke of the damping piston 9 in dependence on velocity.

As seen from FIG. 3, the ring-shaped valve disks 25, 26 have two damping passages 29, 29a which are flush with the annular channel 30 formed between the spacer sleeve 24 and the annular piston 23. The thickness a of the spacer sleeve 24 in the direction of the axis 5 exceeds the corresponding thickness b of the annular piston 23.

In the position of rest, seen in FIG. 2, of the damping piston 9, a radial channel 31 forms between the pressure-valve disk 25 and the pressure-piston member 12, corresponding to the thickness of the distance plate 27; it connects the annular channel 30 with the annular gap 21. In the position of rest, a radial channel 32 is formed between the traction-valve disk 26 and the traction-piston member 16, connecting the annular channel 30 with the annular gap 22. The valve disks 25, 26 are made of spring steel; they are very thin, having a thickness of for instance 0.1 mm. The outside diameter d of the valve disks 25, 26 is less than the inside diameter D of the casing 1. The fronts 33, 34, turned towards the respective valve disk 25 and 26, of the piston members 12 and 16 may be provided with bypass channels 35, 35a which are radial of the axis 5 and allocated to the respective damping passage 29, lapping it radially of the axis 5 and mouthing into the respective annular gap 21, 22.

The mode of operation of the velocity-dependent damping device 28a of the gas spring will be explained in the following, taken in conjunction with FIGS. 4 to 7.

Figure 4:
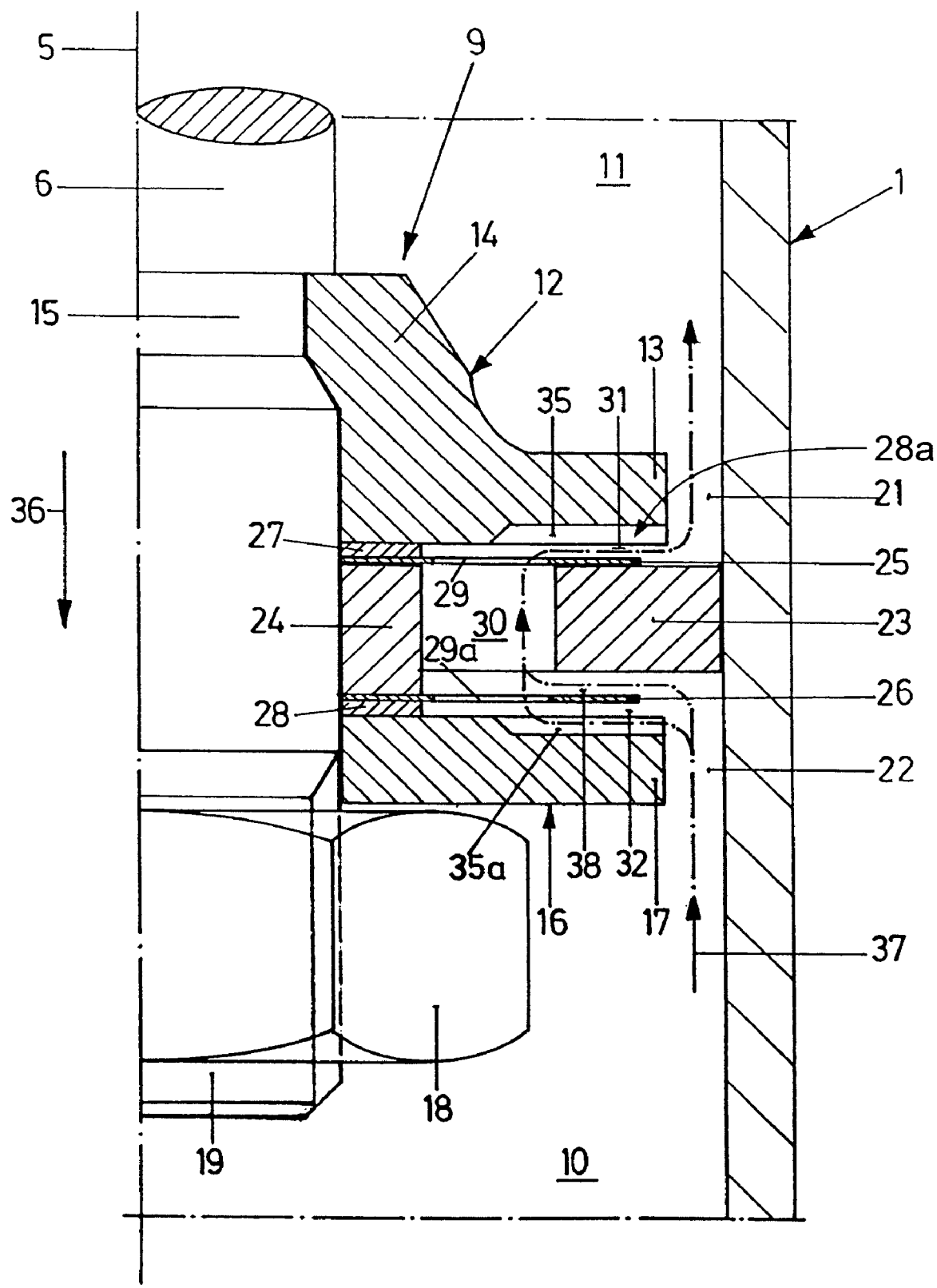
FIG. 4 is an illustration of the damping piston at a low push-in velocity.

FIG. 4 illustrates the position of the various parts of the damping piston 9 when the piston rod 6 is inserted into the casing 1 in the push-in direction 36 against the restoring force of the compressed-gas filling at a velocity below the velocity that would lead to near blockage of the gas spring. In this case, the annular piston 23 bears against the pressure-valve disk 25 without substantially bending it in the direction of the axis 5. The axial extension of the annular piston 23 being less than that of the spacer sleeve 24, damping fluid flows in accordance with the line of flow 37 from the sectional casing chamber 10 through the annular gap 22, the radial channel 32, the damping passages 29 of the traction-valve disk 26, the annular channel 30, the damping passages 29 of the pressure-valve disk 25, the radial channel 31 and the annular gap 21, into the sectional casing chamber 11. Furthermore, damping fluid flows from the annular gap 22 externally around the traction-valve disk 26 and a radial channel 38 between the traction-valve disk 26 and the annular piston 23 towards the annular channel 30. In this case, the annular piston 23 rests closely on the area of the pressure-valve disk 25 located outside the damping passages 29.

Figure 5:
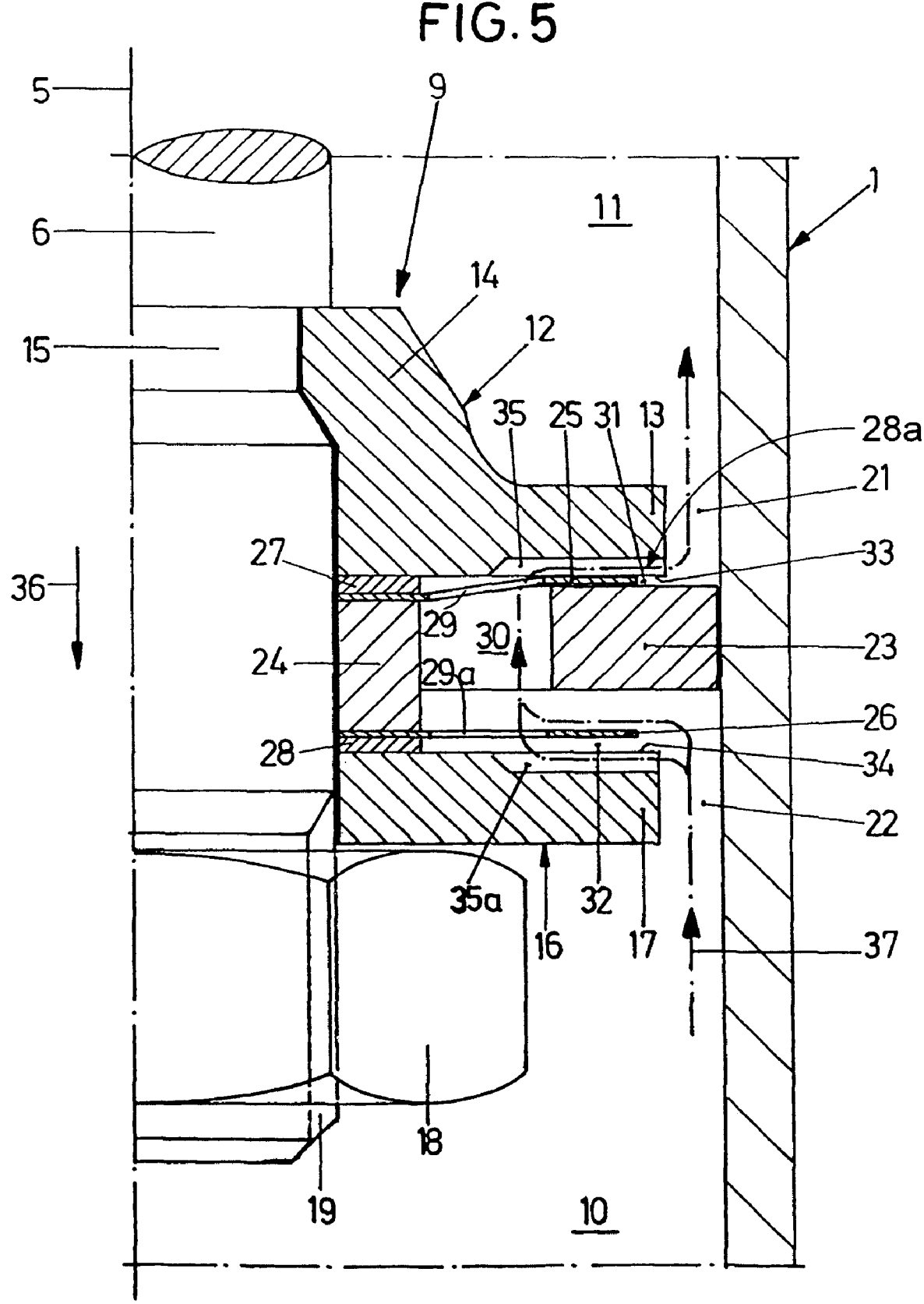
FIG. 5 is an illustration of the damping piston at a high push-in velocity.

When the push-in velocity of the piston rod 6 in the push-in direction 36 is raised beyond a given range, then the pressure of the damping fluid on the annular piston 23 on the one hand and on the pressure-valve disk 25 on the other rises to such an extent that, according to FIG. 5, the pressure-valve disk 25 is deviated towards the pressure-piston member 12, bearing sealingly against the front 33 thereof, as seen in FIG. 5. With the radial channel 31 thus being closed except for the bypass channels 35, the damping force increases abruptly. In a variant of the gas spring, the damping force may reach the range of blockage of the gas spring, if for example no bypass channels 35 are available and if the entire damping piston 9 possesses only minor leakages.

Figure 6:
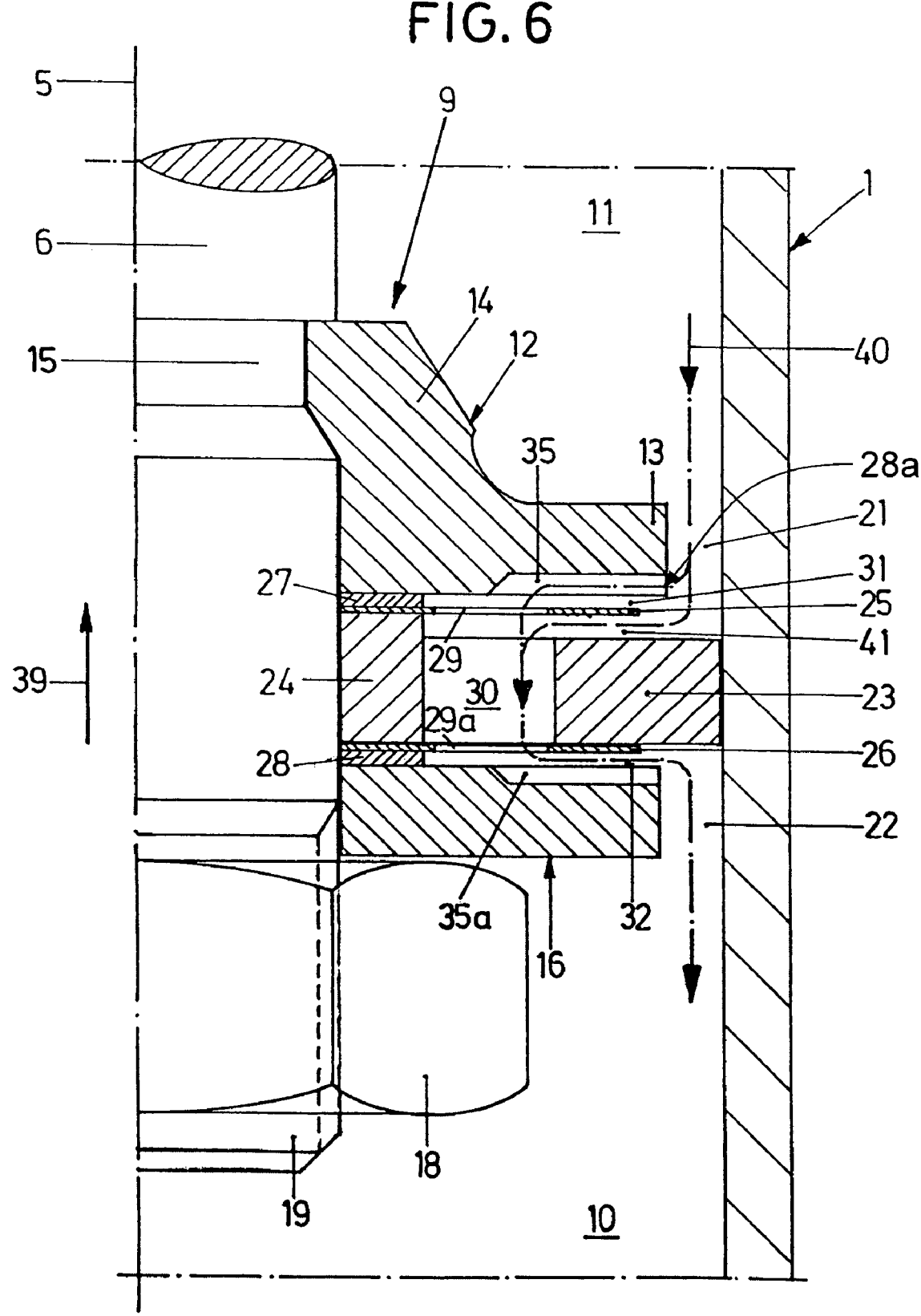
FIG. 6 is an illustration of the damping piston at a low push-out velocity.

But when the piston rod 6 is extracted from, or pushed out of, the casing 1 in the push-out direction 39 at a low velocity, the annular piston 23, as seen in FIG. 6, bears against the traction-valve disk 26 without deforming it in the direction of the axis 5. The damping fluid then flows in accordance with the line of flow 40 from the sectional casing chamber 11 through the annular gap 21, the radial channel 31, the damping passages 29 of the pressure-valve disk 25, the annular channel 30, then through the radial channel 32 and the annular gap 22, into the sectional casing chamber 10. Furthermore, damping fluid flows from the annular gap 21 externally around the pressure-valve disk 25 and the radial channel 41 formed between the disk 25 and the annular piston 23, and towards the annular channel 30.

When the push-out velocity exceeds a given range, then the banking-up pressure that acts on the annular piston 23 and the traction-valve disk 26 grows to such an extent that the traction-valve disk 26, in accordance with FIG. 7, comes to rest on the front 34 of the traction-piston member 16 so that the damping fluid may flow only through the bypass channels 35a of the front 34 of the traction-piston member 16 in the direction towards the sectional casing chamber 10. Damping increases sharply. As seen from the foregoing, in the exemplary embodiment illustrated, velocity-dependent damping can be obtained upon insertion as well as extension of the piston rod 6 into, and out of, the casing 1. In lots of fields of application with velocity-dependent damping needed only upon insertion, it is conceivable to embody the velocity-dependent damping device 28a without any traction-piston member 16 and traction-valve disk 26, there being no velocity-dependent damping of the piston-rod push-out motion in this embodiment. The foregoing detailed specification may be conferred without any difficulty to a gas spring in which velocity-dependent damping only involves the push-in motion and not the push-out motion.

As seen from the above, the terms "pressure-piston member 12" and "pressure-valve disk 23" have been chosen, because these parts only enter into action when pressure acts on the gas spring i.e., upon insertion of the piston rod 6 into the casing 1, whereas the "traction-piston member 16" and the "traction-valve disk 26" become active with traction acting on the gas spring i.e., upon extension of the piston rod 6 from the casing 1.

As further seen from the foregoing, the piston-rod-6 push-in and push-out velocity that is accompanied with a jump from simple damping to near blockage may vary by modification of the thickness of the valve disks 25 and 26. The thicker the valve disks 25, 26, the more rigid they are i.e., there is an increase in the velocity at which simple damping will pass into increased damping. The thinner the valve disk 25 and 26, the lower this velocity will be.

In the same way, modification of the thickness of the distance plates 27, 28 in the direction of the axis 5 can vary the travel that the respective valve disk 25 and 26 must cover from its position of rest in the direction of the axis 5 before the respective radial channel 31 and 32 is closed. Since the force that is constituted by the mentioned banking-up pressure and needed for deformation of the valve disk 25, 26 in the direction of the axis 5 will grow as the travel necessary for deformation increases, the corresponding radial channel 31 and 32 becomes smaller upon decreasing thickness of the distance plate 27 and 28 and vice versa.

Figure 9:
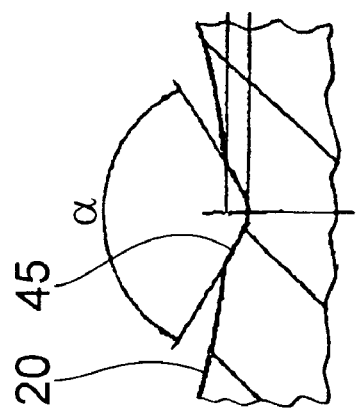
FIG. 9 is a sectional view on the line IX—IX of FIG. 8.
Figure 8:
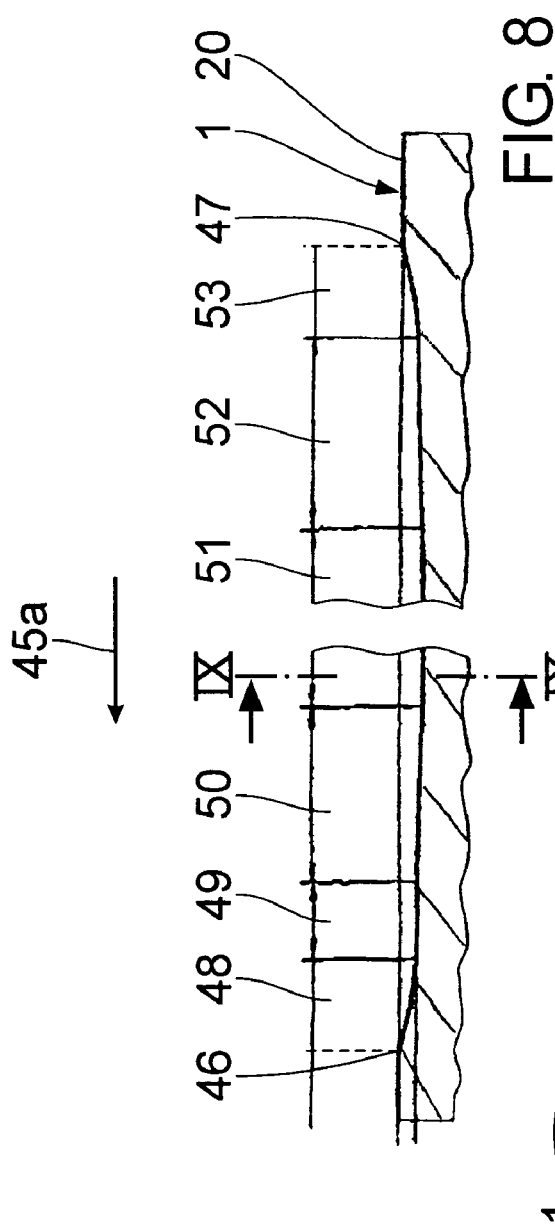
FIG. 8 is an interrupted detailed view, not true to scale, of a casing tube of the gas spring of FIG. 1.
Figure 10:
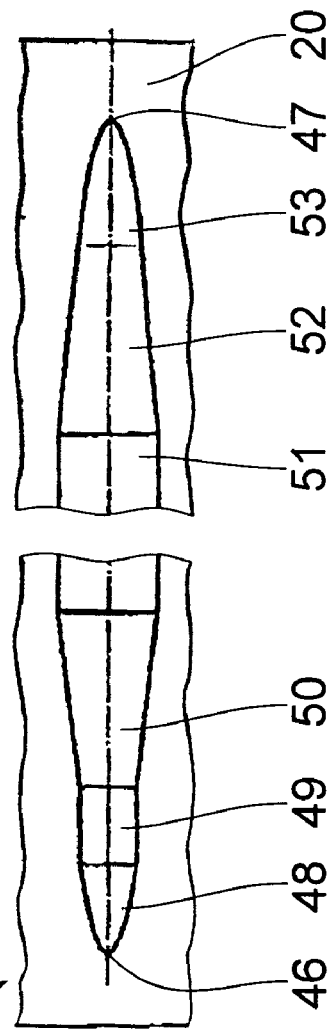
FIG. 10 is an interrupted plan view of an inside wall of the casing tube in the vicinity of the detailed view seen in FIG. 8.

A profiled longitudinal groove 45 is formed on the inside wall 20 of the casing 1, the illustration in FIGS. 8 through 10 of the width and depth thereof being excessively enlarged and not true to scale. The longitudinal groove 45 constitutes a damping device for the path-dependent damping of a motion of stroke of the damping piston 9. With the damping piston 9 in a position level with the longitudinal groove 45, this groove 45 forms a damping-fluid passage between the two sectional casing chamber 10, 11. The longitudinal groove 45 varies lengthways in cross-sectional shape and depth. A push-in direction is roughly outlined by the arrow 45a in FIG. 8.

Between a start 46 of the groove 45 that is allocated to a position of maximum insertion of the damping piston 9, and an end 47 of the groove 45 that is allocated to a position of maximum extension of the damping piston 9, the longitudinal groove 45 comprises an overall of six groove areas. The following dimensions are given only by way of example; they depend on the respective design of the gas spring and moreover on the requirements of the respective field of application. In a first groove area 48 that adjoins the start 46, the longitudinal groove 45 becomes still wider and deeper, reaching a depth of approximately 0.1 mm. An adjoining second area 49 of the longitudinal groove 45 has a constant cross section and depth. In an adjoining third groove area 50, the longitudinal groove 45 widens and deepens, reaching a maximum depth of 0.35 mm. An adjoining fourth longitudinal-groove-45 area 51 has a constant cross section and depth. In an adjoining fifth groove area 52, the longitudinal groove 45 tapers and flattens until having a depth of approximately 0.1 mm. The length of the fifth groove area 52 is comparable to that of the third groove area 50. In a sixth groove area 53 between the fifth area 52 and the end 47, the longitudinal groove 45 passes into the inside wall 20 of the casing 1. The groove areas 48 to 50 are relevant to the path-dependent damping effect in the vicinity of the final push-in position of the damping piston 9.

FIG. 9 illustrates a typical cross-sectional shape of the longitudinal groove 45 in the vicinity of the fourth groove area 51. The bottom of the longitudinal groove 45 has a cross-sectional radius of curvature of approximately 0.4 mm. The two side walls of the groove 45 that, in the cross-sectional view, pass into the inside wall 20 make an angle α in the range of 120°.

Figure 11:
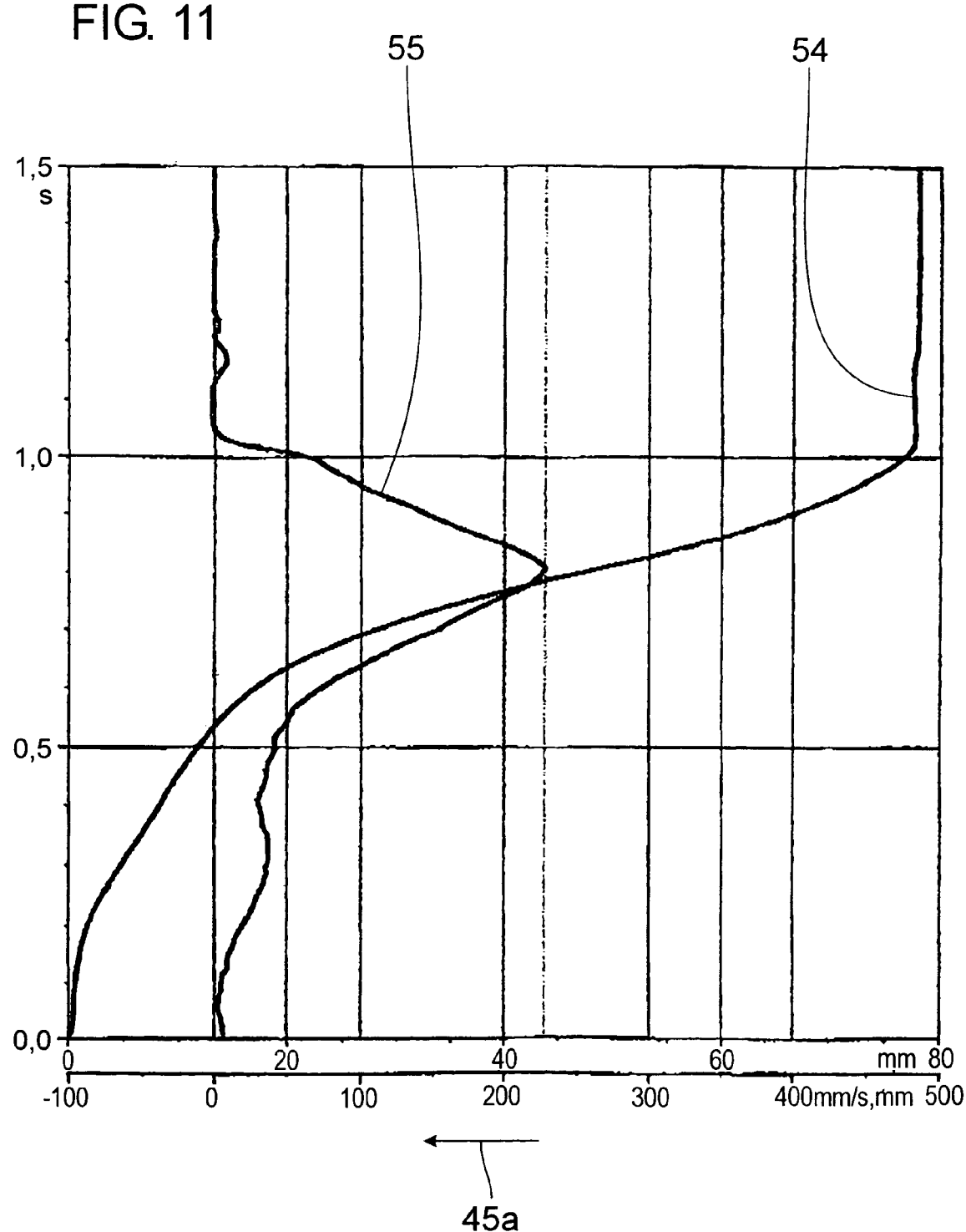
FIG. 11 is a diagram reflecting, as a function of time, the stroke and velocity of a motion of a damping piston that is pushed into the casing of the gas spring.

In the following, path-dependent damping by means of the longitudinal groove 45 is going to be explained, taken in conjunction with the diagram of FIG. 11. Based on the example of a motor-vehicle tailgate that is being closed, the diagram comprises a first curve 54 showing the time-dependent stroke of the damping piston 9 upon insertion into the casing 1 in the push-in direction 45a, with the abscissa plotting the stroke in mm and the upward ordinate axis plotting the time in s. The stroke curve 54 clearly shows that, as the tailgate is being closed, the push-in motion first accelerates in the fourth groove area 51 of constant cross section, owing to the potential energy of the tailgate, then decelerating in the vicinity of the groove end 46 i.e., in the final position of the damping piston 9 on the push-in side. Consequently, there is a more pronounced damping effect on the motion of stroke in the vicinity of in particular the groove end 46 of the travel of the damping piston 9 than there is in the area of the remaining stroke. A curve 55 of stroke velocity, also plotted in FIG. 11, explains the push-in velocity, with the abscissa showing the velocity in mm/s. Proceeding from the start of insertion at a velocity 0 when the tailgate is being released, the velocity of stroke first rises in the fourth groove area 51 until reaching a maximum of approximately 225 mm/s in the third groove area 50. Upon passage through the second groove area 49, the tailgate is being braked for a short while to an approximately constant stroke velocity in the range of about 30 mm/s. Then, after passage through the second groove area 49, the stroke velocity again drops, reaching 0 in the vicinity of the groove end 46. The path-dependent damping effect of the longitudinal groove 45 provides for multi-stage variation of damping of the stroke of the damping piston 9.

The end of damping-piston-9 extension is also controlled by the described damping effect, there being no abrupt stop when it is reached.

When a limit of stroke velocity is exceeded, the action of path-dependent damping is supported by the effect of the velocity-dependent damping device 28a specified above, preventing the maximal stroke velocity from being exceeded.

It is conceivable to use a synthetic- or silicone-based, temperature-resistant oil as a damping fluid in the gas spring according to FIGS. 1 to 11.

What is claimed is:

1. A gas spring, comprising
   a cylindrical casing (1) which has an inside wall (20), a central longitudinal axis (5), a bottom (2) and an end (4) opposite the bottom (2);
   a piston rod (6) which is concentric of the central longitudinal axis (5) and which is extended from the end (4) through a guide and seal unit (8) and out of the casing (1);
   a damping piston (9) which is disposed on an end, inside the casing (1), of the piston rod (6), dividing the casing (1) into two sectional casing chambers (10, 11);
   a filling of compressed gas inside the casing (1);
   a damping device (28a) for velocity-dependent damping of a motion of stroke of the damping piston (9), said velocity-dependent damping device (28a) comprising
   at least one piston member (12, 16) which is tightly mounted on the piston rod (6),
   an annular piston (23) which is displaceable in the direction of the axis (5) relative to the at least one piston member (12, 16), and
   at least one elastic valve disk (25, 26) which is disposed between the at least one piston member (12, 16) and the annular piston (23) and which bears sealingly against the at least one piston member (12, 16) when a given limit of stroke velocity is exceeded; and
   another damping device (45) for path-dependent damping of a motion of stroke of the damping piston (9),
   said path-dependent damping device (45) comprising a damping fluid passage with a path-dependently varying cross section between the two sectional casing chambers (10, 11),
   said damping fluid passage being a longitudinal groove (45) on the inside wall (20) of the casing (1),
   said longitudinal groove (45) substantially extending between a position of maximum insertion and a position of maximum extension of the damping piston (9) and comprising at least
   a first groove area (48) having a varying cross section and being allocated to the position of maximum insertion,
   a second groove area (49) having a constant cross section and adjoining to the first groove area (48),
   a third groove area (50) having a varying cross section and adjoining to the second groove area (49), and
   a fourth groove area (51) having a constant cross section and adjoining the third groove area (50).

2. A gas spring according to claim 1, wherein the path-dependent damping device (45) has means for stronger damping of the motion of stroke in an area of two end positions (46) thereof than in an area (51) of the remaining stroke.

3. A gas spring according to claim 1, wherein an embodiment of the path-dependent damping device (45) has means for multi-stage variation of damping of the motion of stroke.

4. A gas spring according to claim 1, wherein the cross section of the damping-fluid passage in the area (48, 53) of one of the two end positions (46) of the stroke is smaller than it is in the area (51) of the remaining stroke.

5. A gas spring according to claim 1, wherein variation of the cross section of the damping device (45) takes place in several steps (48, 50).

6. A gas spring according to claim 1, wherein the longitudinal groove (45) has a varying width for cross-sectional variation.

7. A gas spring according to claim 1, comprising a damping fluid in the form of temperature-resistant oil.

8. A gas spring according to claim 7, comprising a synthetic-based damping fluid.

9. A gas spring according to claim 7, comprising a silicone-based damping fluid.

10. A gas spring according to claim 1, wherein the longitudinal groove (45) has a varying depth for cross-sectional variation.

11. A gas spring according to claim 1, wherein the longitudinal groove (45) has a varying width and a varying depth for cross-sectional variation.

12. A gas spring, comprising
    a cylindrical casing (1) which has an inside wall (20), a central longitudinal axis (5), a bottom (2) and an end (4) opposite the bottom (2);
    a piston rod (6) which is concentric of the central longitudinal axis (5) and which is extended from the end (4) through a guide and seal unit (8) and out of the casing (1);
    a damping piston (9) which is disposed on an end, inside the casing (1), of the piston rod (6), dividing the casing (1) into two sectional casing chambers (10, 11);
    a filling of compressed gas inside the casing (1);
    a damping device (28a) for velocity-dependent damping of a motion of stroke of the damping piston (9), said velocity-dependent damping device (28a) comprising
    at least one piston member (12, 16) which is tightly mounted on the piston rod (6),
    an annular piston (23) which is displaceable in the direction of the axis (5) relative to the at least one piston member (12, 16), and
    at least one elastic valve disk (25, 26) which is disposed between the at least one piston member (12, 16) and the annular piston (23) and which bears sealingly against the at least one piston member (12, 16) when a given limit of stroke velocity is exceeded; and
    another damping device (45) for path-dependent damping of a motion of stroke of the damping piston (9),
    said path-dependent damping device (45) comprising a damping fluid passage with a path-dependently varying cross section between the two sectional casing chambers (10, 11),
    said damping fluid passage being a longitudinal groove (45) on the inside wall (20) of the casing (1),
    said longitudinal groove (45) substantially extending between a position of maximum insertion and a position of maximum extension of the damping piston (9) and comprising at least
    a first groove area (48) having a varying cross section and being allocated to the position of maximum insertion,
    a second groove area (49) having a constant cross section and adjoining to the first groove area (48),
    a third groove area (50) having a varying cross section and adjoining to the second groove area (49), and
    a fourth groove area (51) having a constant cross section and adjoining the third groove area (50),
    wherein the longitudinal groove (45) comprises two side walls which at least partially make an angle ($\alpha$) in the range of 120°.

* * * * *